(12) United States Patent  (10) Patent No.: US 12,405,707 B2
Singhal  (45) Date of Patent: Sep. 2, 2025

(54) APPARATUS AND METHOD FOR A SIMPLIFIED MENU SCREEN IN HANDHELD WIRELESS DEVICES

(71) Applicant: Tara Chand Singhal, Torrance, CA (US)

(72) Inventor: Tara Chand Singhal, Torrance, CA (US)

(*) Notice: Subject to any disclaimer, the term of this patent is extended or adjusted under 35 U.S.C. 154(b) by 0 days.

(21) Appl. No.: 18/230,635

(22) Filed: Aug. 5, 2023

(65) Prior Publication Data

US 2023/0409168 A1  Dec. 21, 2023

Related U.S. Application Data

(63) Continuation of application No. 14/044,697, filed on Oct. 2, 2013, now Pat. No. 11,726,631.

(60) Provisional application No. 61/869,662, filed on Aug. 24, 2013.

(51) Int. Cl.
*G06F 3/048* (2013.01)
*G06F 3/0482* (2013.01)

(52) U.S. Cl.
CPC ................... *G06F 3/0482* (2013.01)

(58) Field of Classification Search
CPC .................................................... G06F 3/0482
See application file for complete search history.

(56) References Cited

U.S. PATENT DOCUMENTS

| 9,954,996 | B2* | 4/2018 | Christie | H04M 1/72436 |
| 2010/0062811 | A1* | 3/2010 | Park | H04M 1/72472 |
| | | | | 455/566 |
| 2010/0138853 | A1* | 6/2010 | Tanaka | G11B 27/105 |
| | | | | 725/23 |
| 2010/0281430 | A1* | 11/2010 | Safar | G06F 3/0488 |
| | | | | 715/834 |
| 2011/0258581 | A1* | 10/2011 | Hu | G06F 3/04817 |
| | | | | 715/811 |
| 2012/0179968 | A1* | 7/2012 | Madnick | G06Q 30/02 |
| | | | | 715/777 |
| 2013/0021287 | A1* | 1/2013 | Endo | G06F 3/04886 |
| | | | | 345/173 |
| 2013/0144674 | A1* | 6/2013 | Kim | G06Q 30/0267 |
| | | | | 705/7.19 |
| 2015/0135108 | A1* | 5/2015 | Pope | G06F 1/1671 |
| | | | | 715/767 |

* cited by examiner

*Primary Examiner* — David E Choi
(74) *Attorney, Agent, or Firm* — Kasha Law LLC; John R. Kasha; Kelly L. Kasha

(57) ABSTRACT

A simplified menu screen for a handheld mobile wireless device with a display/touch screen that provides for and displays an initial menu, a simplified menu in lieu of an original menu screen, on the display screen when the device is first activated, the simplified menu displays only up to five menu selection choices and thereby simplifies the initial menu screen and minimizes the complexity of the initial screen and a desired menu selection there from. A part of the simplified menu screen is used for live feed minimizing the number of steps required to access display of data relevant to a user.

20 Claims, 10 Drawing Sheets

PRIOR ART

Method For Menu Function 30

102 Detect device on

104 Read menu selection data table 32 and select first Three/five choices with highest average selections 106 Display simplified menu screen 16 with these choices in display space A 108 Display/activate live data in display space B 110 Detect swipe touch on screen area 12

112 Display original menu 14

114 Detect selection of a menu item from either original menu screen 14 or simplified menu screen 16

116 Update menu selection frequency data in table 32

118 Sort with highest number in descending order

Figure 5A

APPARATUS AND METHOD FOR A SIMPLIFIED MENU SCREEN IN HANDHELD WIRELESS DEVICES

CROSS REFERENCE

This application claims priority from U.S. application Ser. No. 14/044,697, filed Oct. 2, 2013, titled "Apparatus and Method for a Simplified Menu Screen in Handheld Mobile Wireless Devices," which claims priority from U.S. Application No. 61/869,662, filed Aug. 24, 2013, titled "Apparatus and Method for a Simplified Menu Screen in Handheld Mobile Wireless Devices," which applications are incorporated herein by reference.

FIELD OF THE INVENTION

A simplified menu screen for a handheld mobile wireless device with a display/touch screen displays an initial menu, a simplified menu in lieu of an original menu screen, when the device is first activated. The simplified menu displays a simplified initial menu screen that minimizes the complexity of the menu screen and a desired menu selection there from.

BACKGROUND

There are now-a-days many electronic devices with limited size display screens that are in the categories of smart phones and tablet computers. These devices have limited size display screen relative to personal computers of either laptop or desktop size. These devices are handheld mobile wireless devices with touch screens.

Given that these devices have limited size screens as well as have touch screens, display and selection there from by touch of a menu choice among a large number of menu choices displayed on the limited size screen presents a unique challenge for the users of the device.

Hence, for these devices with limited size screens, selection of a menu choice on the go, while the device is being held in the hand, presents issue of easy and quick menu selection that likely creates mental stress or strain in being able to easily and quickly identify and select a menu choice.

It is the objective of the embodiments herein to provide for improved menu display screen for these handheld devices, be they smart phones or handheld tablet computers that improve display of menus and selection of a menu choice there from.

SUMMARY

The embodiments relate to improvements in display and selection there from of items on a menu displayed on handheld mobile wireless devices. These improvements also relate to improvements in man machine interface between a device user and the device based on how users use these devices.

Prior art FIG. 1, for a device 10 with a display screen 12, shows display of a menu screen 14 when the device 10 equipped with a display screen 12 is turned on by swiping the locked screen 13.

The menu screen 14 displays a large number of choices of menu items that require a user to select one from a device display while the device is being held in the hand. It is believed, this creates problems of mental strain or concentration caused by the complexity of the menu for having displayed so many choices to select a choice there from.

The embodiments described herein provide for a simplified menu screen for a handheld mobile wireless device with a display/touch screen that has a menu function resident in the device that displays an initial menu, a simplified menu in lieu of an original menu screen, on the display screen when the device is first activated. The simplified menu displays preferably only three or up to five menu selection choices.

The embodiments described herein also proved for an improved man machine interface by providing display of desired data content in the form of a live feed on the display screen with a minimum of user actions.

A menu function maintains data in a memory of the device that supports a selection of only the three menu and up to five choices that is based on either a highest average number of selections of these specific menu choices in a general population or a highest average number of selections of these specific menu choices by a device user. Thereby simplifying the initial menu screen and minimizing the complexity of the initial screen and a desired menu selection there from.

Optionally, the menu function enables a part of the display screen space to be set aside and used for displays with changing/live content. Such live content may include one or more of a date/time, weather, live event video, live news feed, and live stock data. A swipe touch can alternatively display either the simplified menu or the original menu providing a user a visually simplified flexibility in selecting a menu icon choice.

These and other aspects of the embodiments herein are further described in detail with the help of the accompanying drawings and the description, where similar number are used to identify similar features of the embodiments.

BRIEF DESCRIPTION OF THE DRAWINGS

Some of the novel features of the embodiments will be best understood from the accompanying drawings, taken in conjunction with the accompanying description, in which similar reference characters refer to similar parts, and in which:

FIG. 5A is a method diagram for a display of simplified menu screen for handheld electronic devices such as a tablet computer and a smart phone.

DESCRIPTION

Introduction

Figure 1:
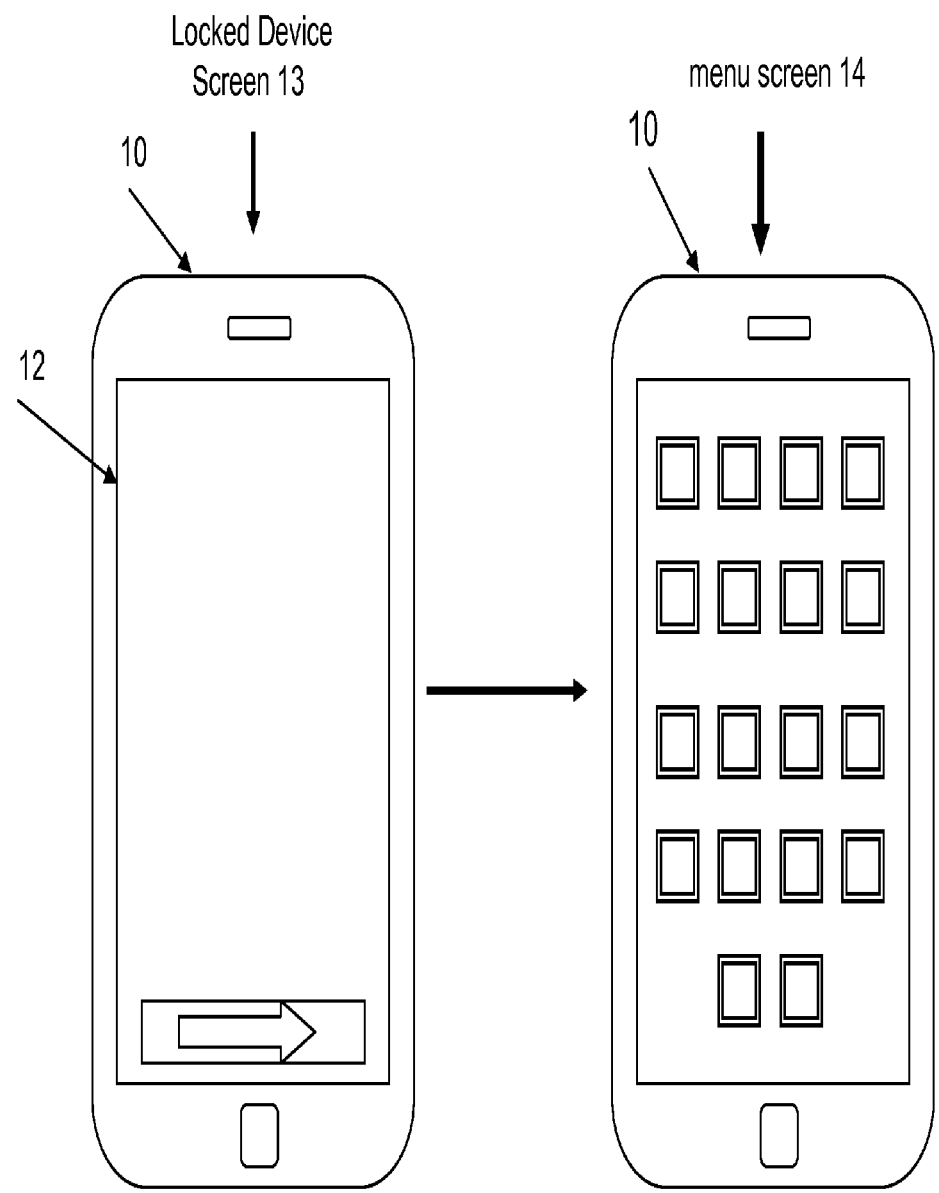
FIG. 1 is a prior art display of menus on handheld electronic devices such as a tablet computer and a smart phone.

As illustrated in prior art FIG. 1, in a traditional menu screen such as for iPhone®, up to 20 menu choices may be arranged in a 4 by 5 grid of menu icons and if the selection choices exceed 20, they are displayed in an another display screen.

It is believed that showing so many menu choices in a small display screen that requires the user to review the displayed choices and then select one choice from these choices, presents a man-machine interface problem.

In a desktop and laptop computing devices, these devices are propped on a stationary platform or table and have bigger display screens, this problem of man-machine interface would not exist. In contrast, the handheld devices generally also known as smart phones, when the device is handheld, a user may be moving around. When the device is handheld and user may be moving around, it may be difficult to select a menu choice from so many menu choices from a small screen.

The man-machine interface problem that is identified is that a user has to mentally comprehend the complexity of the menu screen and then have to select one choice from a large number of menu icons. Further, a menu screen requires a selection step to select an app to access specified data to be viewed. It is believed, this creates an additional complexity requiring an extra step for the use of the handheld devices.

Therefore, it is the objective of the embodiments herein is to simplify the menu screen to make it easier for the menu choices to be quickly understood and to be quickly selected.

It is believed that in the way humans operate that the initial set of menu choices be limited in number not to exceed five. Further, it is the objective to minimize the number of actions and or steps that a user would have to perform to access desired applications or their data.

To address the man machine interface issues as highlighted above, a simplified menu screen is described herein. As illustrated with the help of FIGS. 2A and 2B, for a handheld mobile wireless device 10 with display/touch screen 12, a menu function operating in the device provides for and has a simplified menu screen 16.

The simplified menu screen 16 preferably provides for display of only up to five menu selection choices. These menu selection choices may be displayed in two groups as a group of three choices 20A and as a group of two choices 20B.

In some embodiments there may be only menu choice group 20A thus limiting the menu choices to only three in this simplified menu screen 16.

These menu choices either group 20A or both groups 20A and 20B may be displayed either on the top half, space A, of the display screen 12 or the bottom half space B of the display screen 12.

Since the number of menu choices is limited to 3 or 5 the display space A may display them with either in bigger size and or spaced apart from each other making them easier to be discerned and selection there from to be made quickly.

There may be up to five such menu choices, even though three choices are preferred. It is believed, that having three choices provides for an easy comprehension of the choices and thus enable faster selection as compared to having a very large number of choices as in the original menu screen 14 which makes it difficult for some people to read, comprehend and identify the choice they want to select.

Having fewer choices such as three also provides for large menu choice icons on the limited size of the screens that also makes comprehension of choices quicker and easier. That, having as the first or the initial layer of the menu screen with three or up to a maximum of display of five choices improves the man machine interface in such devices.

Figure 3:
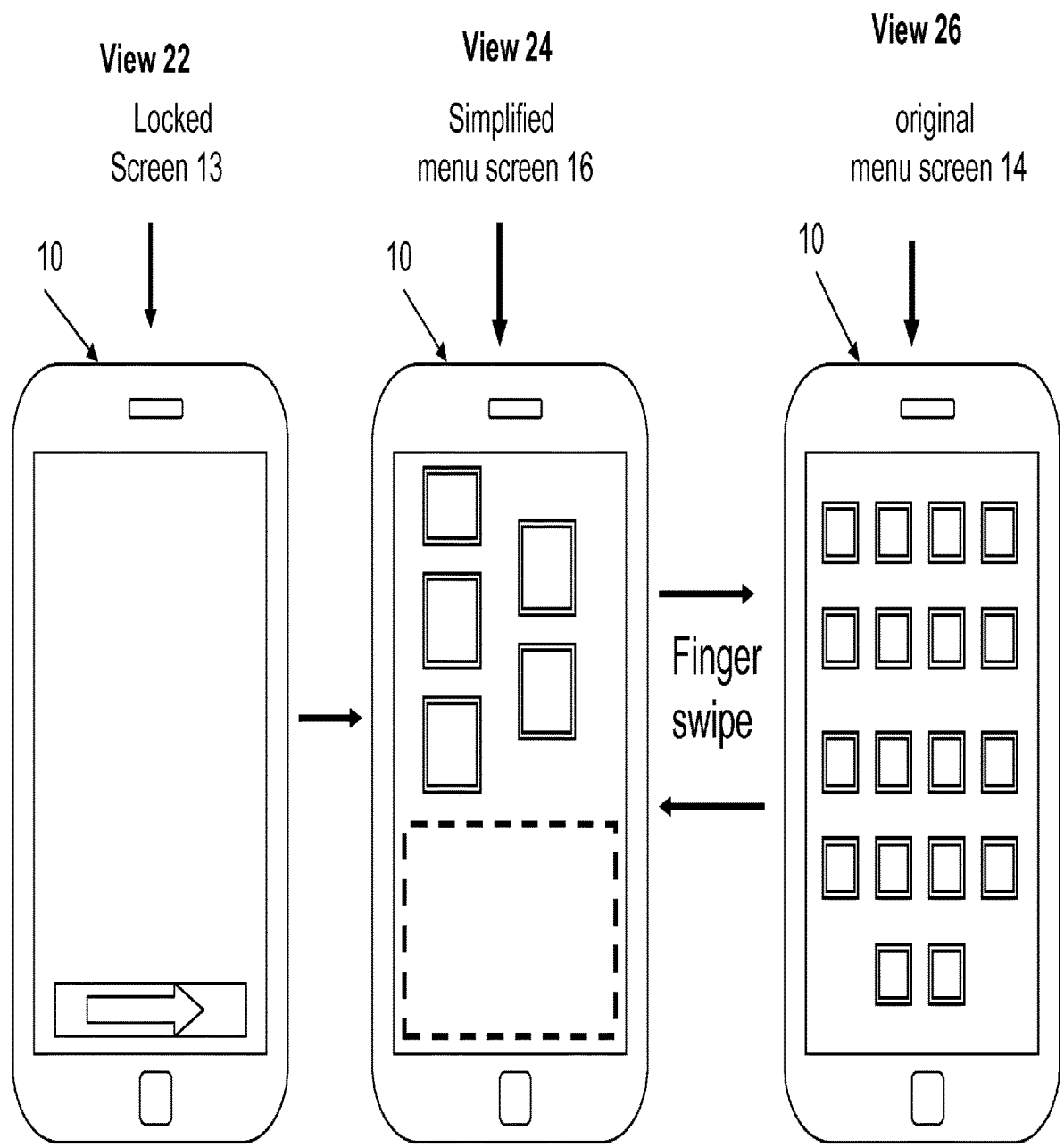
FIG. 3 is a function diagram that illustrates features of a preferred embodiment of a display of simplified menu screen for handheld electronic devices such as a tablet computer and a smart phone.

With reference to FIG. 3, the original menu screen 14 is still available to a user but is provided as a secondary screen layer behind the initial or the simplified menu screen 16 layer of menu choices. It is believed that for most people, the selection from three or up to five choices is easier mentally and visually on the limited size screens.

Figure 2A:
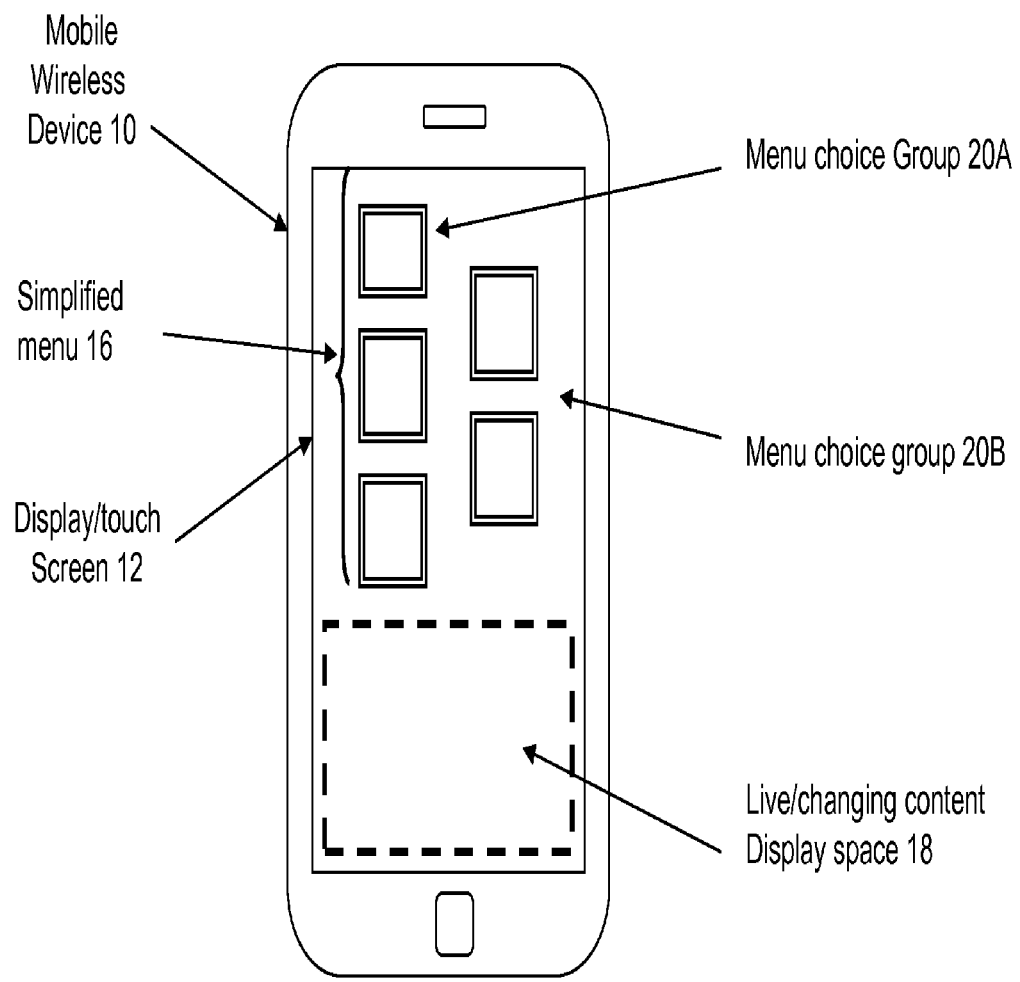
FIGS. 2A and 2B are simplified illustrations for a display of simplified menu screen for a handheld electronic device such as a tablet computer and a smart phone.
Figure 2B:
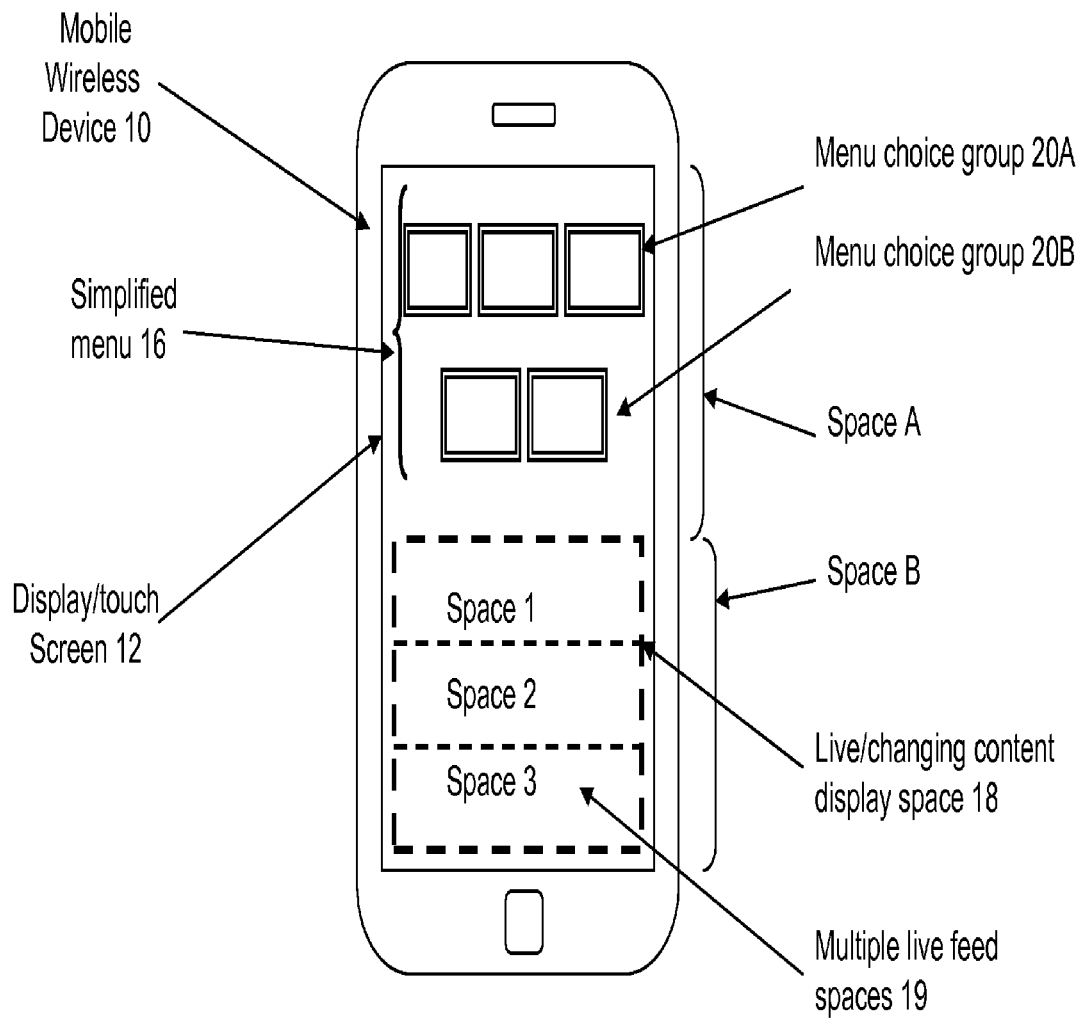

As illustrated in FIGS. 2A and 2B, limiting the menu choice to three items on the display screen in space A also provides for a part of the display screen 12 as space B to be used as a live data display space 18.

Based on the way people use such devices, they are interested in a few items of interest for them that may be considered live updated on the web. These may include sports results, date/time, weather, event reminders, live video, stock updates, or news feed etc. Therefore, additionally and optionally the display screen 12 also provides for display of a live data feed screen space 18.

As illustrated in FIG. 2B, the display space 18 may allow for selection of up to three live feed spaces 19. A user may be allowed optional selection of which of these many choices of live data, among those displayed in space 1, space 2, and space 3 he/she may be interested in.

Depending on the size of the space 18, multiple such live data may be displayed in up to three spaces 19. Further the size of the space 18 may be adjusted to suit individual preferences and the size of the screen. These live feed space 18 features are further illustrated later herein with the help of FIGS. 6A and 6B.

As illustrated in FIG. 2B, as a simplified illustration, a user may position the three to five menu icons on the top half of the screen in Space A and use the bottom half of the screen Space B for space 18 for display of live and or changing data. Such live or changing data feed may be created in the device itself or be received from an external source over the wireless network such as web server on the Internet.

It is believed, using the display screen space as above provides for most users an easier man machine interface with the device for the types of things they are interested in doing for most of the time with such devices.

The selection of the three or up to five maximum menu icons may be customized to individual users. As a simplified illustration, for a specific device user, if the use of the device is for camera function, a camera selection icon may be one of these three or up to five such menu choices. As a simplified illustration, for a specific device user, if the use of the device is for making a voice call, a call selection icon may be one of these three or up to five such menu choices.

As later described, a heuristic logic may be used to determine which three or five menu choices may be displayed on the simplified screen 16 among all the possible choices from the original screen 14, that may number in twenty plus.

As illustrated in FIG. 3, view 22 shows the locked screen of device 10. View 24 shows the simplified menu screen 16 when the locked screen is unlocked. View 26 shows the original menu screen 14, when the simplified screen 16 is swiped with a finger. Thus the original menu screen 14 may be easily accessed from the simplified menu 16 by a finger swipe. In the same way the simplified menu 16 may again be accessed by the swipe in the reverse direction from the original menu 14.

These and other aspects of the embodiments herein are described in detail where the headings are provided for reader convenience.

Menu Function 30

The device 10 has a menu function 30 that is illustrated with the help of FIGS. 4, 5A, 5B, 5C, 6A and 6B. A device such as device 10 has an operating system. The menu function 30 may be advantageously implemented as a part of the device operating system, as a device operating system is responsible for managing the display of menu screens.

Figure 4:
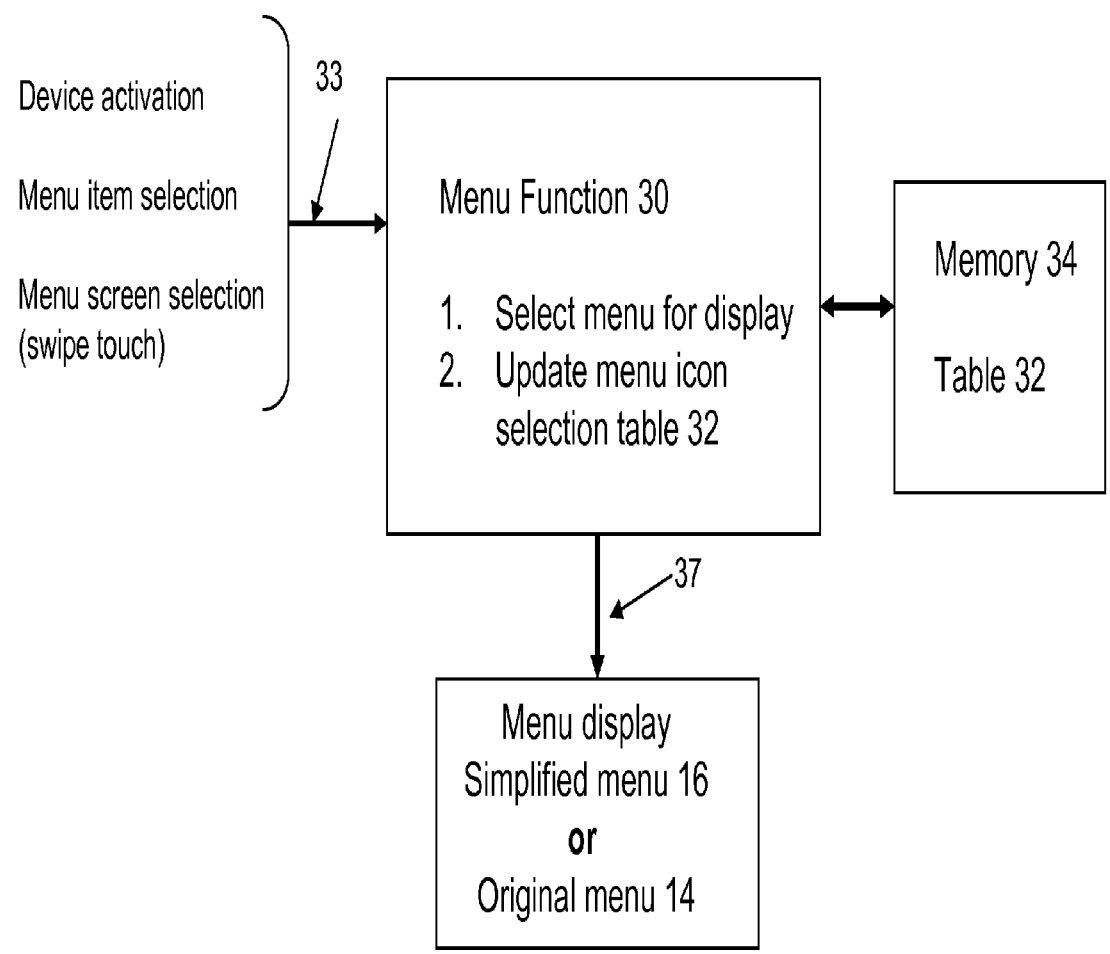
FIG. 4 is a functional diagram for a simplified illustration of a function for display of simplified menu screen for handheld electronic devices such as a tablet computer and a smart phone.

As illustrated in FIG. 4, a menu function 30 is shown. The function 30 receives inputs 33 of, device status, menu screen selection, and menu item selection and outputs 37 the selection of either the simplified menu screen 16 or the original menu screen 14 to be displayed on the device 10.

The menu function 30 has the sub-functions of, (i) select menu for display and (ii) update menu icon selection table 32. The function 30 interfaces with device memory 34 and a table 32 maintained therein.

As illustrated with the help of FIGS. 4, the function 30 maintains data in a memory 32 of the device related to and that support a selection of only the three menu choices that is based on either a highest average number of selections of these specific menu choices in a general population or a highest average number of selections of these specific menu choices by a device user, thereby simplifying the initial menu screen and minimizing the complexity of the initial screen and a desired menu selection there from.

As illustrated with the help of FIG. 4 the device has a menu function 30 resident in the device that displays an initial menu 16, a simplified menu 16 in lieu of an original menu screen 14, on the display screen 12 when the device is first activated, the simplified menu 16 displays only three menu selection choices 20.

Figure 5B:
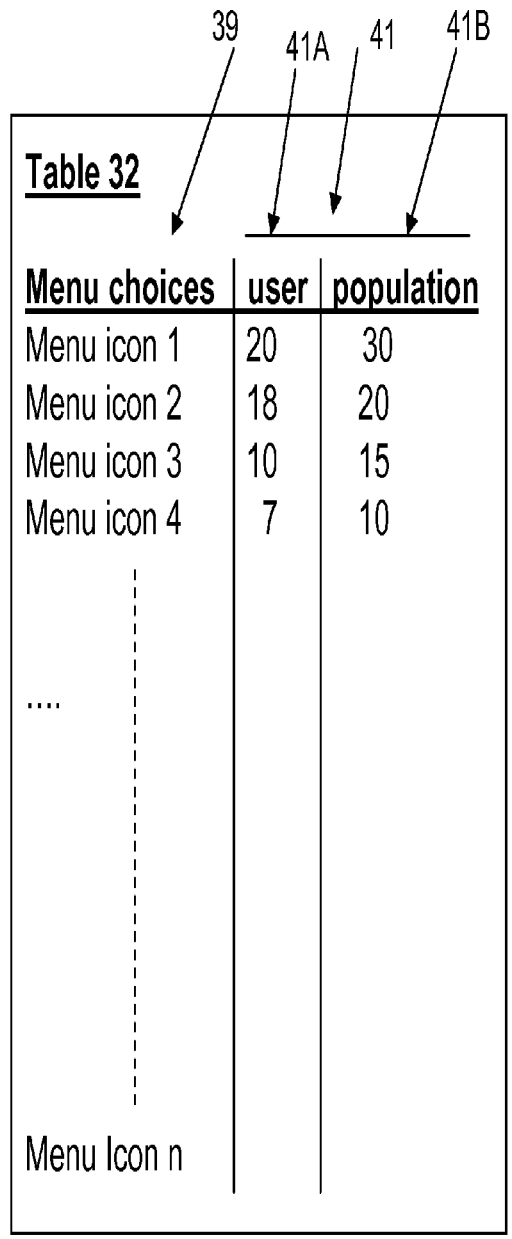
FIG. 5B is a data table that supports display of simplified menu screen for handheld electronic devices such as a tablet computer and a smart phone.

With reference to FIG. 5A, the method steps for the menu function 30 are illustrated. The table 32 used with the menu function 30 is as illustrated in FIG. 5B.

Method for Menu Function 30
 At step 102, detect device status on
 At step 104, read menu selection data table 32 and select first three/five choices with highest average selections
 At step 106, display simplified menu screen 16 with these choices in display space A.
 At step 108, display/activate live feed data in display space B.
 At step 110, detect swipe touch on display screen 12
 At step 112, display original menu screen 14
 At step 114, detect selection of a menu item from either original menu screen 14 or the simplified menu screen 16
 At step 116, update menu selection frequency data in table 32
 At step 118, sort the frequency of selections with highest number in descending order As illustrated in FIG. 5B, table 32 has a list 39 of different menu icons along with their frequency of use 41. There are two different frequencies of use, one for the device user 41A and the other for the general population 41B.

The table 32 maintains the frequency of section data of the various menu choices. Initially when the device is newly used, it may not have such data and in lieu of such data 41A from the user's own selections, a generalized population data 41B may be used. Over time the device user use 41A profile is populated and that data may be used. Alternatively, the user may be given an option to select the three or up to five menu choices, they use the most.

Figure 5C:
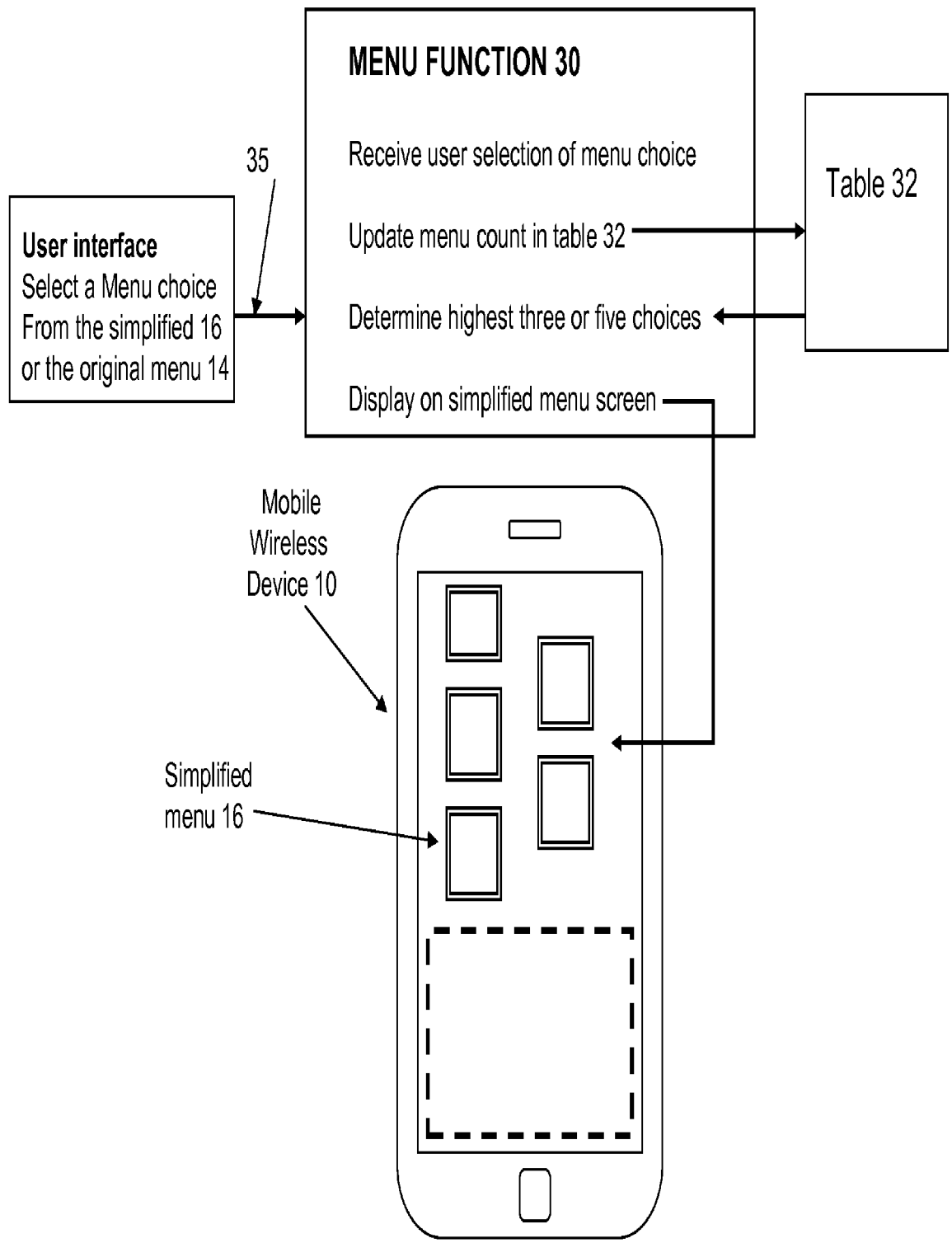
FIG. 5C is a functional diagram for a display of simplified menu screen for handheld electronic devices such as a tablet computer and a smart phone.

As shown in a simplified illustration, in FIG. 5C, the menu function 30 updates the count of a menu selection in the table 32 for the user selection each time a user selects a menu choice from the list of menu selection. The menu function 30 has a user interface 35.

The menu function 30 performs the sub-functions of (i) receive user selection of menu choice, (ii) update menu count in table 32, (iii) determine highest three or five choices, and (iv) display on simplified menu.

The function 30 enables a part of the display screen 18 that displays changing/live content to include one or more of a date/time, weather, live event video, live news feed, and live stock data.

The function 30 provides for a swipe touch on any other part of the display screen displays the entire original menu of choices 14. As illustrated in FIG. 4, alternatively, the function 30 provides for a swipe touch on any part of the display screen displays the entire original menu of choices 14.

Yet also alternatively, the function provides for a swipe touch on any part of the display screen toggles the display between the simplified menu 16 and original menu 14 of choices.

Figure 6A:
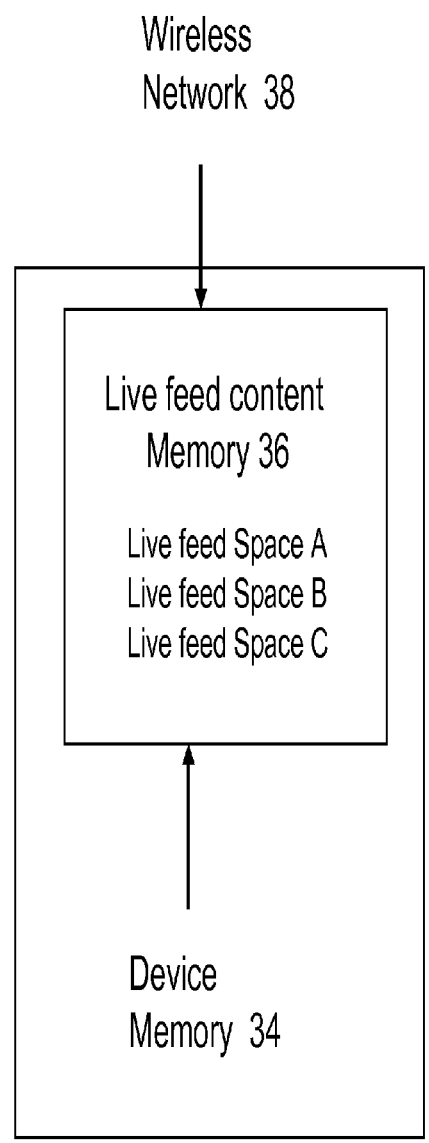
FIG. 6A is a functional diagram for display of live feeds for the simplified menu screen for handheld electronic devices such as a tablet computer and a smart phone.

FIG. 6A illustrates that the device memory 34 has memory space for storage of live content 36. This memory 36 is partitioned into three spaces A, B and C, enabling up to three different live feed data be stored.

Figure 6B:
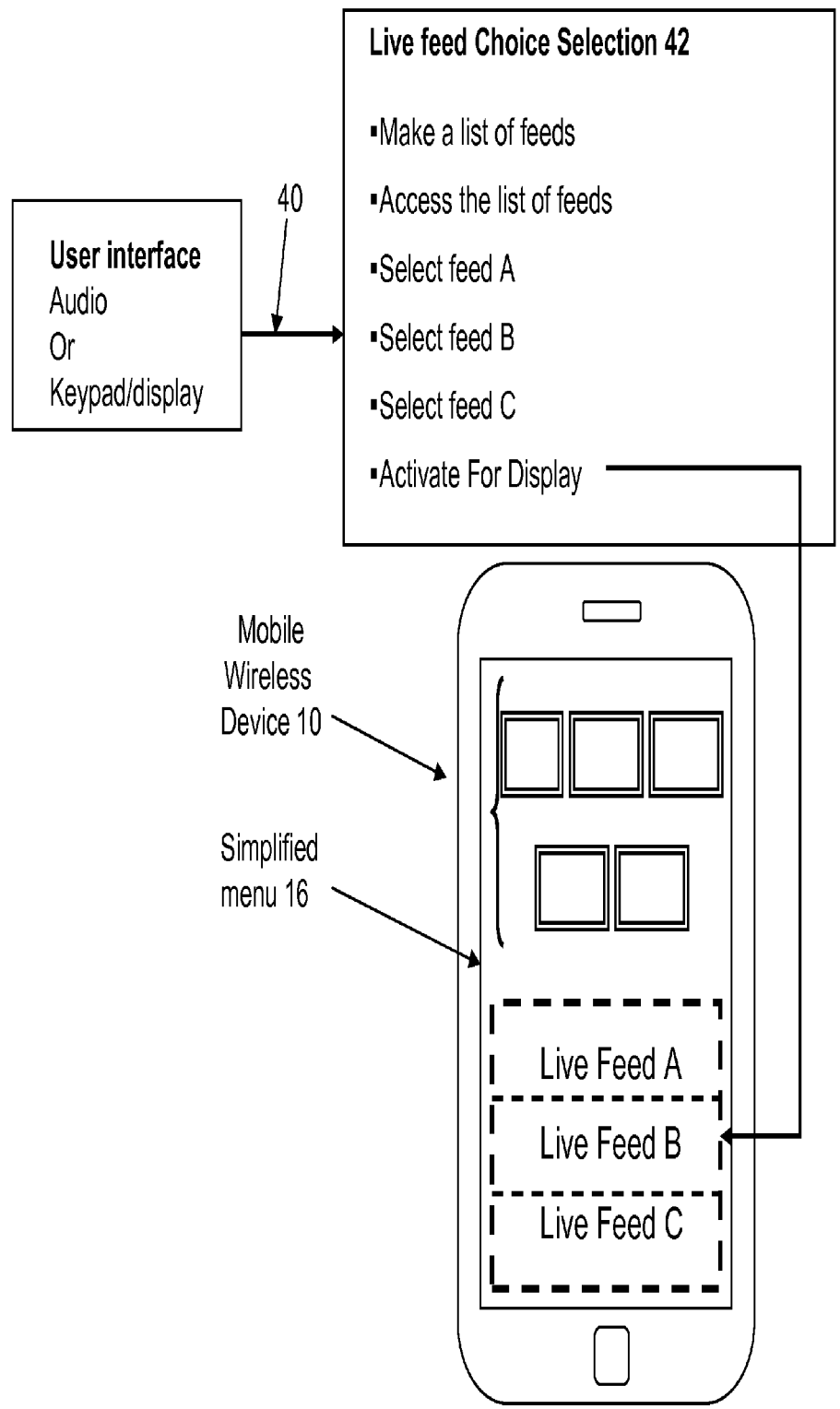
FIG. 6B is a functional diagram for a selection of live feeds for the simplified menu screen for handheld electronic devices such as a tablet computer and a smart phone.

As illustrated with the help of FIG. 6B, is a live feed selection function 42. The function 42 has a user interface 40 that enables a user to select these live feeds. The user may select one or two or three live feeds and decide on the order in which they are displayed in space 18. The live feed/data that is displayed on the part of the display screen has been pre-identified by or for a device user.

A live feed selection function 42 has the sub-functions of, (i) Make a list of feed, (ii) Access the list of feeds, (iii) Select feed A, (iv) Select feed B, (v) Select feed C, and (vi) Activate For Display Up to half of the display screen space is used for the live feed/data that is displayed on the part of the display screen has been pre-identified for a device user. The live feed display space is partitioned into multiple partitions that enable more than one live feed to be displayed at the same time in the display space.

In an embodiment, a display screen for a handheld mobile wireless device with a display/touch feature has a menu function resident in the device that displays on the device on the device being unlocked, an initial menu, a simplified menu in lieu of an original menu screen, on the display screen when the device is first activated, the simplified menu displays only up to five menu selection choices. The function enables a part of the display screen space that displays changing/live content to include one or more of a date/time, weather, live event video, live news feed, and live stock data. The number of menu choices on the simplified screen may be up to five in number.

Mode of Use

In one mode of use, when a user unlocks a locked screen of device 10, he/she sees simplified menu screen 16 with screen space 18, with the live content that he she may be interested, as had been pre-selected. That is, with a single action of unlocking the screen, the user is immediately exposed to the display of live data of interest to the user. The user then may be satisfied and the device goes back into the locked state.

In another mode of use, when a user unlocks a locked screen of device 10, he/she sees simplified menu screen 16 with screen space 18, with the live content that he she may be interested, as had been pre-selected. User then selects a menu choice from the three choices being displayed. These three choices are the one frequently used by the user and it is highly likely that he/she would select one of these menu choices. That is, a user without a mental strain to identify a choice from a complex menu with a large number of choices would find it easier to select a choice with a bigger icon displays.

In yet another mode of use, when a user unlocks a locked screen of device 10, he/she sees simplified menu screen 16 with screen space 18, with the live content that he she may be interested, as had been pre-selected. User then wants to select a menu icon and does not find that icon choice among the three menu choices of the simplified menu screen. User then swipes a finger and sees displayed the original menu screen with all the menu choices being displayed. The user then makes a menu choice selection from this menu.

Each time a user makes a menu item selection, the selection count for that menu is incremented in table 32. Each time the screen is unlocked, the current highest used three menu choices are displayed on the simplified screen.

It is believed, with the features of man machine interface of the embodiments described herein, a user would access the data or application that he/she may desire in fewer steps then that prior art affords as well as remove unnecessary clutter from the display screen.

Simplicity of what is displayed on a display screen is a desirable feature. That is one reason; Google search screen does not clutter the main display screen with advertisements like so many other web pages do.

Therefore, it is believed, that users would find the simplicity and ergonomic value of the embodiments of menu screen described herein highly desirable.

The technology underlying operating system functions and software technology that supports creation and display of menus and live feed space on mobile wireless devices is in itself considered prior art and is widely used in the industry.

A handheld mobile wireless device has a mobile wireless device with a display/touch screen. A menu function resident in the memory of the device and operating in a CPU of the device displays as an initial menu, a simplified menu in lieu of an original menu screen, on the display screen when the device is first activated, the simplified menu displays only up to five menu selection choices, thereby simplifying a complexity of the original menu screen and a desired menu selection there from.

The menu function maintains data in the memory of the device related to and that support a selection of only the up to five menu choices that is based on either a highest average number of selections of these specific menu choices in a general population or a highest average number of selections of these specific menu choices by a device user.

The menu function uses a part of the display screen, not used for displaying menu icons, for display of changing/live content to include one or more of a date/time, weather, live event video, live news feed, and live stock data. The up to five menu icons that are displayed are arranged in two groups of menu icons, one group with three menu icons and another group with two menu icons. The two groups of menu icons are displayed either in a vertical orientation or in a horizontal orientation on the display screen of the device. A swipe touch on any part of the display screen toggles the display between the simplified menu and the original menu of choices.

Method of Operation

A method for a simplified menu screen has the following steps where all the steps may not be used or used in the order specified:
a. using a mobile wireless device with a display/touch screen;
b. having a menu function resident in the device displaying an initial menu, a simplified menu, in lieu of an original menu screen on the display screen when the device is first activated, the simplified menu displaying only three menu selection choices;
c. maintaining the function data in a memory of the device related to and that support a selection of only the three menu choices that is based on either a highest average number of selections of these specific menu choices in a general population or a highest average number of selections of these specific menu choices by a device user, thereby simplifying the initial menu screen and minimizing the complexity of the initial screen and a desired menu selection there from;
d. enabling by the function on a part of the display screen displays with changing/live content to include one or more of a date/time, weather, live event video, live news feed, and live stock data.
e. displaying the entire original menu of choices on a touch on any other part of the display screen.
f. displaying the entire original menu of choices on a swipe-touch on any part of the display screen.
g. toggling the display between the simplified menu and original menu of choices on a swipe touch on any part of the display screen.

A method for a simplified menu screen for a handheld mobile wireless device, where all the steps may not be used or used in the order has the steps:
a. enabling use a mobile wireless device with a display/touch screen and having a menu function resident in the device;
b. displaying, by the menu function, an initial menu, a simplified menu, in lieu of an original menu screen on the display screen when the device is first activated, the simplified menu displaying only up to five menu selection choices, thereby simplifying the initial menu screen and minimizing the complexity of the initial menu screen and a desired menu selection there from.
c. maintaining by the menu function, data in a memory of the device related to and that support a selection of only the up to five menu choices that is based on either a highest average number of selections of these specific menu choices in a general population or a highest average number of selections of these specific menu choices by a device user.
d. displaying by the menu function on a part of the display screen, not used for display of menu icons, displays with changing/live content to include one or more of a date/time, weather, live event video, live news feed, and live stock data.
e. displaying the up to five menu icons arranged in two groups of, a group of three icons and a group of two menu icons;
f. displaying the two groups of menu icons, in either a vertical orientation or in a horizontal orientation.
g. toggling the display between the simplified menu and the original menu of choices on a swipe-touch on any part of the display screen.

A display screen for a handheld mobile wireless device with a display/touch feature has a menu function resident in the device that displays on the device on the device being unlocked, an initial menu, a simplified menu in lieu of an original menu screen, on the display screen when the device is first activated, the simplified menu displays only up to five menu selection choices. The menu function uses a part of the display screen space as a live feed display space for displaying a changing/live content to include one or more of a date/time, weather, live event video, live news feed, and live stock data.

A swipe touch on any part of the display screen toggles the display between the initial menu screen and an original menu of choices screen.

The live feed/data that is displayed on the part of the display screen has been pre-identified for a device user. Substantially half of the display screen space is used for the display of the live feed/data that is displayed on the part of the display screen has been pre-identified for a device user.

The live feed display space is partitioned into multiple spaces that enable more than one live feed to be displayed at the same time in the live feed display space.

A handheld mobile wireless device with a display screen and a touch screen has a menu function operating in the device as part of a device operating system in a hardware processor of the device, after the device is powered on, displays an initial menu display screen, the initial menu display provides for the display of at least two different display spaces, a display space A and a display space B. The display space A displays a limited number of menu icons and the display space B displays a changing and live digital content, whether the content is pre-stored in the device itself or received live in the device from a wireless network.

The spaces A and B each occupy substantially half of the display screen. The space A displays a maximum number of menu icons not to exceed six in number. The space B displays a plurality of live feeds not to exceed three in number. A swipe touch on any part of the display screen toggles the display between the initial menu screen and an original menu of choices screen.

In summary, the preferred embodiments are on a simplified menu screen 16 for a mobile handheld wireless device making it easier to navigate complexity of original menu screen 14 with a large number of menu choices as in prior art. Further the simplified menu screen 16 also displays a live data feed space 18 that makes it highly convenient to quickly view data such as sports results, news feed, date/time etc.

While the particular invention, as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. A method for a man-machine interface in handheld mobile computing and communication devices having a display screen, comprising the steps of:
providing a handheld mobile device, having a CPU, a memory, wireless connectivity, an operating system, a display screen, and a menu function stored in the memory and operating in the CPU, wherein providing by the menu function a human-factor driven man-machine interface;
creating and maintaining by the menu function in the memory (i) a frequency of use of icon selections, (ii) identification of live digital content, and (iii) original menu screen icons;
partitioning, by the menu function, the display screen, into multiple display areas, wherein providing in a first display area, the display of selection icons to include those icons ranked highest in frequency of use based on a prior history of use of those icons by a user;
providing in a second display area, display of live real time digital content; and
providing a display of icons for handheld mobile device operation.

2. The method of claim 1, further comprising the steps of:
positioning the multiple display areas on the display screen in an order of priority based on user settings.

3. A method for a man-machine interface in handheld mobile computing and communication devices having a display screen, comprising the steps of:
providing a handheld mobile device, having a CPU, a memory, wireless connectivity, an operating system, a display screen, and a menu function stored in the memory and operating in the CPU, wherein providing by the menu function a human-factor driven man-machine interface;
creating and maintaining by the menu function in the memory (i) a frequency of use of icon selections, (ii) identification of live digital content, and (iii) original menu screen icons;
partitioning, by the menu function, the display screen, into multiple display areas, wherein providing in a first display area, the display of selection icons to include those icons ranked highest in frequency of use based on a prior history of use of those icons by a user;
providing in a second display area, display of live digital content; and
providing a display of icons for handheld mobile device operation, wherein
the live digital content includes one or more of sports results, weather, event reminders, live video, stock updates, or news feed.

4. The method of claim 3, further comprising the steps of:
allocating substantially half of the display screen to the display of live digital content.

5. The method of claim 1, further comprising the steps of:
including in the handheld mobile device operation, one or more icons for a camera and a call selection.

6. The method of claim 1, wherein:
the display of selection icons to include those icons ranked highest in frequency of use based on a prior history of use of those icons by users or a mobile device user.

7. The method of claim 1, further comprising the steps of:
structuring the display of the icons in two groups and limiting the number of display of icons to fit in the first display area.

8. The method of claim 1, further comprising the steps of:
adjusting size of the display areas for individual preferences based on the size of the display screen.

9. The method of claim 1, further comprising the steps of:
generating a list of live digital content feeds and displaying the list of live digital content feeds.

10. The method of claim 1, further comprising displaying original menu screen including the display of icons for the handheld mobile device operation.

11. An apparatus for man-machine interfacing comprising:

a handheld mobile wireless device including a CPU, a memory, an operating system, and a display screen;

a menu function, including a user interface, stored in the memory and operating in the CPU, wherein (i) a frequency of use of icon selections is determined, (ii) live digital content is identified, and (iii) original menu screen icons are maintained;

a first display area, within the display screen, wherein selection icons are displayed including displaying selection icons ranked highest in frequency of use based on a prior history of use of selection icons by a user;

a second display area, within the display screen, displaying live digital content; and a display of icons for device operation of the handheld mobile device.

12. The apparatus of claim 11 wherein the user interface is configured to position multiple display areas on the display screen based on user settings.

13. The apparatus of claim 11 wherein the live digital content includes one or more of sports results, weather, event reminders, live video, stock updates, or news feed.

14. The apparatus of claim 11 wherein the menu function is configured to allocate substantially half of the display screen to the display of live digital content.

15. The apparatus of claim 11 further comprising icons for a camera and a call selection.

16. The apparatus of claim 11 wherein the display of selection icons includes those icons ranked highest in frequency of use based on a prior history of use of those icons by a generic user or a mobile device user.

17. The apparatus of claim 11, wherein the menu function is configured to structure the display of the icons in two groups and limit the number of display of icons to fit in the first display area.

18. The apparatus of claim 11, wherein the menu function is configured to adjust sizes of the display areas for individual preferences based on the size of the display screen.

19. The apparatus of claim 11, wherein a list of live digital content feeds is generated, further comprising a display of a list of live digital content feeds.

20. The apparatus of claim 11 further comprising an original menu screen wherein the original menu screen includes the display of icons for the handheld mobile device operation.

* * * * *